United States Patent [19]

Wilson et al.

[11] Patent Number: 4,826,696
[45] Date of Patent: * May 2, 1989

[54] LIPID SYSTEM FOR FILLER COMPOSITION

[75] Inventors: Lonny L. Wilson, Brunswick; Kenneth W. Player, Twinsburg, both of Ohio, Samuel J. Porcello, Toms River, James M. Manns, Glenwood, both of N.J.

[73] Assignee: Durkee Industrial Foods Corp., Cleveland, Ohio

[*] Notice: The portion of the term of this patent subsequent to Dec. 8, 2004 has been disclaimed.

[21] Appl. No.: 31,711

[22] Filed: Mar. 27, 1987

Related U.S. Application Data

[63] Continuation-in-part of Ser. No. 744,362, Jun. 13, 1985, Pat. No. 4,753,812, and a continuation-in-part of Ser. No. 651,088, Sep. 17, 1984, Pat. No. 4,711,788.

[51] Int. Cl.$^4$ ............................ A23D 5/00; A23G 3/00
[52] U.S. Cl. ...................................... 426/94; 426/572; 426/607; 426/613
[58] Field of Search .................. 426/572, 607, 94, 101

[56] References Cited

U.S. PATENT DOCUMENTS

| Re. 31,754 | 12/1984 | Miller et al. | 426/602 |
| 2,359,228 | 9/1944 | Lloyd | 426/101 |
| 3,244,536 | 4/1966 | Kidger | 426/94 |
| 3,600,196 | 8/1971 | Heine | 426/602 |
| 3,949,105 | 4/1976 | Wieske | 426/607 |
| 4,209,536 | 6/1980 | Dogliotti | 426/94 |
| 4,214,012 | 7/1980 | Ainger | 426/607 |
| 4,388,339 | 6/1983 | Lomneth et al. | 426/602 |
| 4,394,392 | 7/1983 | Tresser | 426/101 |
| 4,410,557 | 10/1983 | Miller et al. | 426/607 |
| 4,610,884 | 9/1986 | Lewis et al. | 426/103 |

FOREIGN PATENT DOCUMENTS

| 2403746 | 4/1979 | France . |
| 1013372 | 12/1965 | United Kingdom . |
| 1080998 | 8/1967 | United Kingdom . |

Primary Examiner—Jeanette Hunter
Attorney, Agent, or Firm—Richard H. Thomas

[57] ABSTRACT

A sandwich cream filling composition of improved creaminess comprising a fat matrix consisting essentially of a plastic fat of defined SFI profile and melt point and a high stability oil also of defined SFI profile and melt point, said composition being characterized as having good stand-up throughout a wide temperature range from about 50° F. to about 90° F. and an imperceptible solids content at temperatures above about 98.5° F.

15 Claims, No Drawings

LIPID SYSTEM FOR FILLER COMPOSITION

This application is a continuation-in-part of prior application Ser. No. 744,362, filed June 13, 1985 now U.S. Pat. No. 4,753,812, assigned to assignee of the present application and copending application Ser. No. 651,088, filed Sept. 17, 1984, now U.S. Pat. No. 4,711,788 issued Dec. 8, 1987, also assigned to assignee of the present application.

The present invention relates to soft, edible, filler compositions for bakery products such as cookies and, in particular, to a novel fat blend for such filler compositions.

The present invention will be described with reference to products of the type wherein one layer of a cream or filling is interposed between two horizontal baked pieces in a sandwich fashion, although it will be apparent to those skilled in the art that the present invention has other applications.

BACKGROUND ART

Soft, edible filling compositions for baked goods such as sandwich cookies are well known. Conventionally, such fillings are comprised of a hydrogenated fat or blends of fats, sugar, emulsifier and flavor.

In prior U.S. Pat. No. 3,244,536 to Kidger, it is stated that an essential requirement of a good shortening for a filler composition is that the shortening have a wide temperature range over which the fat is soft and workable, and yet in a solid state. This is necessary to give richness and tenderness to the finished product at room temperature, for instance about 70° F., but also to provide a desired degree of hardness at an elevated hot day temperature of about 90° F., to resist flow from the cookie either by gravity or when compressed by biting on the cookies.

In the '536 patent, specifications given for the fat composition are a Solids Fat Index (SFI) at 50° F. of about 45%, at 80° F. of at least about 25%, at 92° F. of at least about 12.5%, and at 100° F., not greater than 3%. At 104° F., the solids content should not be greater than 0.5%.

It is stated in the patent that from the above figures it should be apparent that a good filler fat retains its consistency at room or ambient temperature and melts completely and rapidly at body temperature.

Another requirement of the fat composition is that it have good shelf stability even under hot weather conditions; that is, resistance to oxidation or oxygen degradation. An indication of the oxidative stability of an oil is the number of hours needed for an oil to obtain a peroxide value of 100 under standard conditions, known as the Active Oxygen Method or AOM Stability.

In the practice of the '536 patent, it is proposed to blend a partially hydrogenated fat having a high $C_{18}$ fatty acid content (at least about 50%) with a vegetable oil having a high proportion of lauric acid, and then subject the blend to interesterification. Tallow and lard are indicated to be preferred hydrogenated fats. Coconut oil and palm kernel oil are listed as suitable high lauric vegetable oils. The end product is said to have a Wiley Melting Point between about 102° and 108° F., preferably between 102° and 104° F.

One problem with the composition of the '536 patent is that, in order to get the specified solids at 80° F. and 92° F., namely 25 and 12.5%, respectively, it is necessary to carry out the hydrogenation of the tallow or lard to a substantial extent. For instance, it is indicated in the patent that the hydrogenation of tallow is conducted to an Iodine Value of about 25–42. In the case of lard, the hydrogenation is conducted to an Iodine Value of about 41–49. In either event, the hydrogenation is sufficient so that at temperatures above 98.5° F., or body temperature, there is substantial unmelted solids in the composition, leaving what is called a "tail" giving a slightly greasy sensation in the mouth following consumption of the cookie and filling.

In prior U.S. Pat. No. 4,214,012 to Ainger et al, a somewhat similar approach is taken to provide a biscuit cream filling. In this patent, the fat composition is an interesterified blend of a lauric component and a non-lauric component. In an example, an oleine fraction of palm kernel oil, remaining after removal of stearine by fractionation, having an Iodine Value of 15–25, is interesterified with a non-lauric stearine recovered from acetone fractionation of palm oil. The product obtained is one having a slip melting point range between about 28°–40° C. and a dilation drop of at least about 500 over the last 10° C. below slip melting point. As with the Kidger U.S. Pat. No. 3,244,536, there is no disclosure in this patent concerning the solids remaining, the so-called "tail", following melting of the fat at body temperature, and elimination of whatever slightly greasy sensation that might exist.

It is a principal object of the present invention to overcome the disadvantages of the prior art, and in particular to provide a fat system having an SFI configuration which provides good stand-up through a wide temperature range, but at the same time has at body temperature of 98.5° essentially a zero solids content, or at least a solids content less than a perceptible amount. It is also an object of the present invention to provide a filling composition similar to that of the Kidger patent, but without the so-called "tail". The disclosure of the Kidger patent is incorporated by reference herein.

In copending application Ser. No. 744,362 there is disclosed a filler cream composition comprising an oleaginous composition and a sugar mixed into the oleaginous composition wherein said oleaginous composition has the solid fat index of:

about 46 to about 52 percent solid at 50° F. (10° C.);
about 26 to about 33 percent solid at 70° F. (21.1° C.);
about 9 to about 15 percent solid at 80° F. (26.7° C.);
up to 5 percent solid at 92° F. (33.3° C.); and
0 or an imperceptible percent solid at body temperature or above.

The oleaginous composition preferably is achieved by a blend of fats comprising a fat of plastic consistency having a Wiley Melting Point of about 85°–99° F., and AOM stability of 75 hours minimum, and an SFI profile of

| Temperature °F. | Approximate SFI Percent |
|---|---|
| 50 | 28–43 |
| 70 | 14–25 |
| 80 | 8–19 |
| 92 | 0–8 |
| 104 | 0–2; and | a hard butter having a Wiley Melting Point of about 91°–102° F. and an SFI profile of

| Temperature °F. | Approximate SFI Percent |
|---|---|
| 50 | 64–81 |
| 70 | 51–82 |
| 80 | 35–76 |
| 92 | 0–22 |
| 100 | 5 max. | the ratio of plastic fat to hard butter being in the weight range of about 60:40 to 95:5.

The disclosure of copending application Ser. No. 744,362 is incorporated by reference herein.

DISCLOSURE OF INVENTION

The present invention resides in a filling composition for baked goods comprising a sweetening amount of sugar, and a matrix forming amount of a vegetable oil blend having a Wiley Melting Point in the range of about 85°–90° F., an AOM stability of at least about 75 hours and an SFI profile as follows:

| Temperature °F. | Approx. SFI Percent | Typical |
|---|---|---|
| 50 | 35–43 | 40 |
| 70 | 13–19 | 16 |
| 80 | 4–8 | 6 |
| 92 | 2 max | 1 |

At body temperature of about 98.5° F., the composition has a zero, or imperceptible, solids content.

The present invention more specifically resides in the discovery that a hydrogenated non-lauric fat or randomly rearranged blend of non-lauric and lauric fat of plastic consistency can be blended with a high stability, partially hydrogenated, non-lauric (e.g. soybean or cottonseed) oil in proportions to provide a fat composition having good stand-up throughout a wide temperature range, but without the so-called "tail", the fat of plastic consistency being one having a Wiley Melting Point of about 85°–99° F., an AOM stability of at least about 75 hours minimum or more, and an SFI profile of

| Temperature °F. | Approx. SFI Percent |
|---|---|
| 50 | 28–43 |
| 70 | 14–25 |
| 80 | 8–19 |
| 92 | 0–8 |
| 104 | 0–2 max | and said high stability oil having an AOM of at least about 90 hours and a Wiley Melting Point of about 65°–75° F.

Unexpectedly, it was found that the simple blend of these two materials in the proportion of about 85 to about 95% plastic fat to about 15 to about 5% high stability oil meets the desired SFI criteria and, at the same time, has zero or negligible solids content at temperatures above body temperature of about 98.5° F. (The proportions are weight proportions.)

By the term "high stability", it is meant that the oil is sufficiently hydrogenated to have an AOM value of at least about 90, preferably about 350 or more.

BEST MODE FOR CARRYING OUT THE INVENTION AND INDUSTRIAL APPLICABILITY

The composition of the present invention, as indicated, is a filling or sandwich cream which comprises, typically, about 60% sugar, about 40% fat, and flavor and coloring. Usually, the composition contains lecithin as a processing aid, e.g., for viscosity control, and/or an emulsifier, e.g., mono- and diglyceride for aeration and mouthfeel. The composition is of the type positioned in sandwich fashion between baked cookies, but is also useful with crackers, biscuits and wafers. The flavor of the filling can be chocolate, vanilla, cheese, fruit, or any other desirable flavor. Similarly, the color can be suitably varied.

It is a characteristic of the composition of the present invention that it has stand-up or firmness through a wide temperature range, going from room temperature, e.g., 70° F., to a hot summer day temperature of for instance 90° F. At the same time, through the same temperature range, the composition also has a smooth, creamy, non-grainy texture or mouth-feel desirable in a product of this type.

To achieve this result, a critical aspect of the present invention lies in the composition of the fat, one component being a hydrogenated or rearranged fat, of plastic consistency, having a defined SFI profile and Wiley Melting Point, a second component being a high stability oil, also of defined SFI and Wiley Melting Point.

One example of a suitable rearranged fat of plastic consistency is Kaola (trademark SCM Corporation) which is a randomly rearranged blend of partially hydrogenated soybean oil and a lauric component, having a Wiley Melting Point of about 87°–93° F. and a SFI profile as follows:

| Temperature °F. | Approx. SFI |
|---|---|
| 50 | 40 |
| 70 | 18 |
| 80 | 8 |
| 92 | 2 max. |
| 100 | — |
| 110 | — |

This product has a minimum AOM stability of about 100 hours and a normally plastic consistency. The lauric component may be palm kernel oil, a palm kernel olein fraction, or a partially hydrogenated derivative of either the oil or olein fraction. This product is conventionally marketed as an ingredient for vegetable dairy systems, mellorines, candies, ice cream bar coatings, nut roasting and the like. Preparation of a rearranged fat such as Kaola follows the technology given in prior patent No. 2,726,158, assigned to assignee of the present application, and will be known to those skilled in the art. This technology is not a part of the present invention.

An example of a hydrogenated fat of plastic consistency that meets the criteria of the present invention is Cirol (trademark SCM Corporation), a partially hydrogenated soybean and cottonseed oil blend, which is plastic in consistency, has a WMP of 91°–95° F., and has an SFI profile as follows:

| Temperature °F. | Approx. SFI Percent |
|---|---|
| 50 | 28–34 |
| 70 | 14–20 |
| 80 | 8–14 |
| 92 | 5 max |

The composition has an AOM stability of about 75 hours minimum.

This product is normally marketed for margarines, frozen desserts, coffee whiteners and as a domestic oil for nut roasting.

Still another hydrogenated fat that can be used in the practice of the present invention is Code 321 (trademark, SCM Corporation). This fat is derived from soybean oil only and is normally plastic in consistency. It has a Wiley Melting Point of 95°-99° F., an AOM stability of 150 hours mininum, and a SFI profile as follows

| Temperature °F. | Approx. SFI |
|---|---|
| 50 | 34–43 |
| 70 | 22–25 |
| 80 | 16–19 |
| 92 | 3–8 |
| 104 | 2 max. |

This fat is normally marketed as a filler, or for snack frying prepared foods, or as a spray oil.

All of these fats have in common similar melt points, high AOM stability, and similar SFI profiles which can be characterized as slightly dish-shaped curving downwardly in a concave slope from about 28–43% solids at 50° F. to near zero or zero solids at 98.5° F.

Normally, the hydrogenated or rearranged plastic fat of this invention is used in the proportion of about 85–95% based on the weight of the lipid portion of the filling or sandwich cream.

The high stability oil of the present invention is a non-lauric oil, preferably soybean, cottonseed or a soybean/cottonseed blend, which has been hydrogenated and then fractionated or winterized. The resulting oil fraction has a Wiley Melting Point of about 65°–75° F., an IV of less than about 100, preferably than about 80, and SFI at 50° F. of about 20 maximum, and an AOM stability of more than about 90 hours, preferably more than about 350 hours.

A preferred high stability oil useful in the practice of the present invention is Durkex 500 (trademark SCM Corporation). This oil is a hydrogenated fractionated soybean/cottonseed oil mixture having a Wiley Melting Point of about 73° F. maximum, a free fatty acid content of about 0.05% (maximum), and an IV of about 74–81. The solid fat index for this oil is 14–20 at 50° F. and 3 max. at 70° F.

This oil is normally used in prepared foods, cosmetics, pharmaceuticals, as a coating agent or release agent, for nut roasting, and for snack frying. It is prepared by first partially hydrogenating a soybean/cottonseed blend and then subjecting the hydrogenated product to solvent fractionation, Durkex 500 being the liquid fraction.

Another high stability oil that can be used in the practice of the present invention is a partially hydrogenated soybean oil obtained by winterization and recovery of the oil fraction. This oil is marketed by SCM Corporation under the trademark Durkex 100. The oil has a Wiley Melting Point of about 67° F. and an SFI at 50° F. of about 11 maximum. Durkex 100 has an IV of about 85–95 and an AOM stability of more than about 90 hours.

The amount of high stability oil employed is about 15–5% based on the weight of the lipid portion or blend of the sandwich composition.

In the practice of the present invention, the filling composition preferably is prepared by mixing the fat and other ingredients (sugar, color, flavoring and emulsifiers) at an elevated temperature sufficient to melt the fat components, and then cooling the blend at a controlled rate in a heat exchanger such as a votator. This type of heat exchanger combines continuous mixing with cooling to obtain a fine crystal size growth and a non-grainy, smooth texture.

Cooling can be to a temperature anywhere between 60° and 110° F., the latter giving a slightly finer crystal structure, the former a slightly coarser crystal structure.

An alternative is to votate the lipid components and then cream in the other components; i.e., complete mixing at a temperature below the melting point of the lipid components.

It may be desirable to include in the fat composition of the present invention a small amount (up to about 2%, basis total fat composition) of a stearine sufficient to function as a seed starter in the cooling and crystallizing step. This small an amount has no noticeable or perceptible affect on the solids content of the blend at temperatures above about 98.5° F.

It also is possible to dilute the sugar content with small amounts of other bulking agents, such as non-fat dry milk (e.g., up to 10%, preferably about 5%). This is disclosed in the prior Kidger U.S. Pat. No. 3,244,536. Spray dried cheese particles can also be used for both flavor and as a bulking ingredient. Other common bulking ingredients can also be used, some of which provide flavor as well as bulk. In this regard, the flavor can be chocolate, vanilla, fruit, cheese and any other flavor compatible with the use intended. Emulsifiers, as mentioned, can be used, in small amounts, to aid in mixing, for instance a small amount of lecithin (e.g.) 0.05 parts per 1000 parts of other ingredients. Mono- and diglycerides can also be used in small amounts for aeration and mouthfeel.

It may be desirable for certain applications, depending upon shipping conditions, point of use, and the like, to modify or compound the bulking composition employed to achieve added stand-up at high temperatures, e.g., 95° F. This can be accomplished using known or conventional technology.

By way of example, a friable protein, such as soy protein, or a high protein bulking agent such as non-fat drymilk, buttermilk solids or whole milk solids, can provide reduced plasticity and/or increased resistance to yield at high temperatures in an oil/bulking agent system. Similarly, starches such as corn syrup solids and low DE maltodextrins are effective in increasing plastic and yield values at high temperatures. Also, certain emulsifiers, for instance, polyglycerol esters of fatty acids, can be incorporated into the fat blend to increase fat plasticity and yield values. One example is the emulsifier blend disclosed in copending application Ser. No. 566,094, filed Dec. 27, 1983 and assigned to assignee of the present application. Another useful additive can be a stabilizer such as triglycerol monostearate used in an amount up to about one percent.

Although the composition of the present invention is essentially anhydrous, up to about 4% moisture can be present, either added or indigenous, and still have shelf stability. Also, although the lipid ingredients can be characterized as "high stability", this does not preclude the use of an antioxidant, if desired.

The percentage of fat blend in the cream composition preferably is in the range of about 35–45%, the balance being sugar and similar ingredients.

EXAMPLE I

The lipid composition was prepared as a filler fat for a sandwich cookie filling composition:

| Ingredient | Weight Percent |
| --- | --- |
| Randomly rearranged blend of partially hydrogenated soybean oil and palm kernel based component (Kaola, trademark SCM Corporation) | 94% |
| High stability vegetable oil (Durkex 500) | 6% |

This blend had a free fatty acid content of about 0.03, a chemical IV of about 52.2, a Mettler Drop Point of about 30.5, a Wiley Melting Point of 89.4° F., and an SFI profile of

| Temperature °F. | Approx. SFI Percent |
| --- | --- |
| 50 | 39.2 |
| 70 | 17.0 |
| 80 | 6.9 |
| 92 | 1.1 |

The composition when blended with flavor, color, sugar, particulate fill and emulsifiers produced a very satisfactory sandwich filling, free of the so-called "tail" normally present.

The FAC composition was

| | |
| --- | --- |
| 8:0 | 1.5 |
| 10:0 | 1.4 |
| 12:0 | 19.6 |
| 14:0 | 6.5 |
| 16:0 | 10.1 |
| 18:0 | 7.7 |
| 18:1 | 49.0 |
| 18:2 | 4.8 |
| 20:0 | 0.2 |

EXAMPLE II

A composition similar to that of Example I was prepared, except with different proportions.

| Ingredient | Weight Percent |
| --- | --- |
| Randomly rearranged blend of partially hydrogenated soybean oil and palm kernel based component (Kaola, trademark SCM Corporation) | 87% |
| High stability vegetable oil (Durkex 500) | 13% |

This blend has a Mettler Drop Point of about 30.1, a percent free fatty acid of about 0.03, a chemical IV of about 53.6, a Wiley Melting Point of about 88.8° F., and an SFI profile of

| Temperature °F. | Approx. SFI Percent |
| --- | --- |
| 50 | 36.8 |
| 70 | 15.1 |
| 80 | 5.7 |
| 92 | 0.7 |

The composition when blended with flavor, color, sugar, particulate fill and emulsifiers produced a very satisfactory sandwich filling which was slightly softer than that of Example I, but also additional stabilization and firmness could be obtained by the addition to the composition of up to about 2% by weight (based on the lipid weight) of a stabilizer such as triglycerol monostearate, and use of a fine grind sugar, respectively, free of the so-called "tail" normally present.

EXAMPLE III

The following are some examples of filler cream compositions prepared employing the filler fat blend of the present invention.

| Sample | % Sugar | % Fat | % Non-fat Dry Milk | % Triglycerol Monostearate |
| --- | --- | --- | --- | --- |
| 1 | 55 | 39.6 | 5 | 0.4 |
| 2 | 55 | 39.8 | 5 | 0.2 |
| 3 | 55 | 39 | 5 | 1.0 |
| 4 | 57.1 | 37.5 | 5 | 0.4 |
| 5 | 59.6 | 35.0 | 5 | 0.4 |

The sugar was milled to a micron particle size of 18.5 mean and a range (80% of total) of 9.4–34.

All samples produced a very creamy filler. Samples 4 and 5 showed slightly better heat stability. The addition of 2% sorbitol also gave slightly increased heat stand-up. Aeration produced a light, fluffy filler.

We claim:

1. A filler cream composition comprising an oleaginous composition and a sugar mixed into the oleaginous composition wherein said oleaginous composition has the solid fat index of about 35 to about 43 percent solid at 50° F. (10° C.);
about 13 to about 19 percent solid at 70° F. (21.1° C.);
about 4 to about 8 percent solid at 80° F. (26.7° C.);
up to 2 percent solid at 92° F. (33.3° C.); and
0 or an imperceptible percent solid at body temperature or above;

the filler cream composition being characterized as having good stand-up throughout a wide temperature range and zero or imperceptible solids content at about 98.5° F.

2. The cream composition of claim 1 wherein the solids content of the oleaginous composition at above about 98.5° F. is zero or imperceptible.

3. The cream composition of claim 1 wherein said oleaginous composition contains soybean oil, cottonseed oil, or a blend of the same.

4. The composition of claim 1 which is aerated.

5. A filling composition for wafers having a smooth texture and stand-up through a wide temperature range, characterized as having an imperceptible lipid fat solids content at a temperature above 98.5° F., comprising (a) a flavoring amount of flavor
(b) coloring;
(c) one or more bulking ingredients; and
(d) a matrix forming amount of a vegetable oil composition having a Wiley Melting Point in the range of about 85°–90° F., an AOM stability of at least about 75 hours, and an SFI profile of

| Temperature °F. | Approximate SFI Percent |
| --- | --- |
| 50 | 35–43 |
| 70 | 13–19 |
| 80 | 4–8 |
| 92 | 2 max. | the vegetable oil composition being characterized as having good stand-up throughout a wide temperature range and zero or inperceptible solids content at about 98.5° F.

6. An anhydrous sandwich filling composition for wafers wherein said composition comprises
   (a) a flavoring amount of flavor;
   (b) a coloring amount of colorant;
   (c) a bulking amount of one or more bulking ingredients; and
   (d) a matrix forming amount of a vegetable oil composition, the improvement wherein said vegetable oil composition has a Wiley Melting Point in the range of about 85°–90° F., an AOM stability of at least about 75 hours, and an SFI profile of

| Temperature °F. | Approximate SFI Percent |
| --- | --- |
| 50 | 35–43 |
| 70 | 13–19 |
| 80 | 4–8 |
| 92 | 2 max. | said composition having a smooth texture and stand-up through a wide temperature range, and an imperceptible fat solids content at a temperature above about 98.5° F.; the vegetable oil composition comprising about 35–45% of the filling composition.

7. The composition of claim 5 wherein said vegetable oil composition is a blend comprising
   (a) a fat of plastic consistency having a Wiley Melting Point of about 85°–99° F., an AOM stability of 75 hours minimum, and an SFI profile of

| Temperature °F. | Approx. SFI Percent |
| --- | --- |
| 50 | 28–43 |
| 70 | 14–25 |
| 80 | 8–19 |
| 92 | 0–8 |
| 104 | 0–2; and |

(b) a non-lauric high stability oil having a Wiley Melting Point of about 65°–75° F., an SFI at 50° of about 20 maximum, and an AOM of at least about 90 hours, the ratio of plastic fat to high stability oil being in the weight range of about 85:15 to about 95:5.

8. A fat blend suitable as a matrix for a filling composition comprising
   (a) a fat of plastic consistency having a Wiley Melting Point of about 85°–99° F., an AOM stability of 75 hours minimum, and an SFI profile of

| Temperature °F. | Approx SFI |
| --- | --- |
| 50 | 28–43 |
| 70 | 14–25 |
| 80 | 8–19 |
| 92 | 0–8 |
| 104 | 0–2; and |

(b) a non-lauric, high stability oil having a Wiley Melting Point of about 65°–75° F., and SFI at 50° F. of about 20 maximum, and an AOM of at least about 90 hours, said blend being characterized as having good stand-up throughout a wide temperature range and zero or imperceptible fat solids content at temperatures above about 98.5° F.; the ratio of plastic fat to high stability oil being in the range of about 85:15 to about 95:5.

9. The fat blend of claim 8 wherein said high stability oil has an AOM of at least about 350 hours.

10. The fat blend of claim 8 wherein said high stability oil is a partially hydrogenated soybean oil, cottonseed oil, or blend of the same, which is subjected to fractionation or winterization, said oil having an IV of less than about 100.

11. The fat blend of claim 9 wherein said high stability oil is a partially hydrogenated soybean oil/cottonseed oil blend subjected to fractionation and having an IV of less than about 80.

12. The fat blend of claims 9, 10, 11 or 12 in a sandwich filling composition.

13. The fat blend of claims 8, 9, 10 or 11 which is substantially anhydrous, further comprising a small amount of seed starter, a stabilizer, or both.

14. A baked product comprising the fat blend of claims 8, 9, 10 or 11.

15. A baked product comprising the filling composition of claims 5, 6 or 7.

* * * * *